(12) United States Patent
Tokudome

(10) Patent No.: US 11,180,945 B2
(45) Date of Patent: Nov. 23, 2021

(54) DOOR OPENING AND CLOSING DEVICE

(71) Applicant: U-SHIN LTD., Tokyo (JP)

(72) Inventor: Tetsuo Tokudome, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 136 days.

(21) Appl. No.: 16/338,792

(22) PCT Filed: Oct. 2, 2017

(86) PCT No.: PCT/JP2017/035813
§ 371 (c)(1),
(2) Date: Apr. 2, 2019

(87) PCT Pub. No.: WO2018/066507
PCT Pub. Date: Apr. 12, 2018

(65) Prior Publication Data
US 2019/0249480 A1 Aug. 15, 2019

(30) Foreign Application Priority Data

Oct. 4, 2016 (JP) .............................. JP2016-196481

(51) Int. Cl.
*E05F 15/73* (2015.01)
*B60J 5/00* (2006.01)
(Continued)

(52) U.S. Cl.
CPC .................. *E05F 15/73* (2015.01); *B60J 5/00* (2013.01); *B60J 5/101* (2013.01); *B60Q 1/00* (2013.01);
(Continued)

(58) Field of Classification Search
USPC .......................................................... 701/49
See application file for complete search history.

(56) References Cited

U.S. PATENT DOCUMENTS 9,470,033 B1 * 10/2016 Dudar ..................... E05F 15/73
2010/0241321 A1 * 9/2010 Luka .................... G01N 21/958
701/49

(Continued)

FOREIGN PATENT DOCUMENTS

JP      2014-530309    11/2014
JP         5643129      12/2014
(Continued)

OTHER PUBLICATIONS

International Search Report dated Nov. 21, 2017 in International (PCT) Application No. PCT/JP2017/035813.

*Primary Examiner* — Tyler D Paige
(74) *Attorney, Agent, or Firm* — Wenderoth, Lind & Ponack, L.L.P.

(57) ABSTRACT

A door opening and closing device includes: a door drive unit capable of opening and closing a door; a detection means for detecting a subject present in an approach area; a measurement unit that measures a distance from the detection means to the subject; a determination unit that determines whether the subject has stopped in the approach area; a setting unit that sets a trigger zone in the approach area a; and a control means for starting control to drive the door drive unit when the subject is determined to have moved into the trigger zone. The setting unit sets the trigger zone to drive the door drive unit on the basis of the separation distance from the detection means to a stopped position.

9 Claims, 14 Drawing Sheets

(51) Int. Cl.
*B60Q 1/00* (2006.01)
*E05B 49/00* (2006.01)
*B60Q 1/50* (2006.01)
*B60J 5/10* (2006.01)

(52) U.S. Cl.
CPC ......... *B60Q 1/0023* (2013.01); *B60Q 1/0035* (2013.01); *B60Q 1/50* (2013.01); *E05B 49/00* (2013.01)

(56) References Cited

U.S. PATENT DOCUMENTS

| | | |
|---|---|---|
| 2013/0169408 A1 | 7/2013 | Endo |
| 2014/0330486 A1 | 11/2014 | Gehin et al. |
| 2015/0009062 A1* | 1/2015 | Herthan .................. G01S 7/415 342/70 |
| 2016/0001700 A1* | 1/2016 | Salter ....................... B60Q 1/24 362/510 |
| 2016/0186480 A1 | 6/2016 | Krauss et al. |
| 2017/0166164 A1* | 6/2017 | Sticherling ............. B60R 25/24 |
| 2017/0166165 A1* | 6/2017 | Schindler ................ G01S 15/08 |
| 2018/0065545 A1* | 3/2018 | McMahon ............... B60Q 1/30 |

FOREIGN PATENT DOCUMENTS

| | | |
|---|---|---|
| JP | 2016-35191 | 3/2016 |
| JP | 2016-89584 | 5/2016 |
| WO | 2015/052259 | 4/2015 |

\* cited by examiner

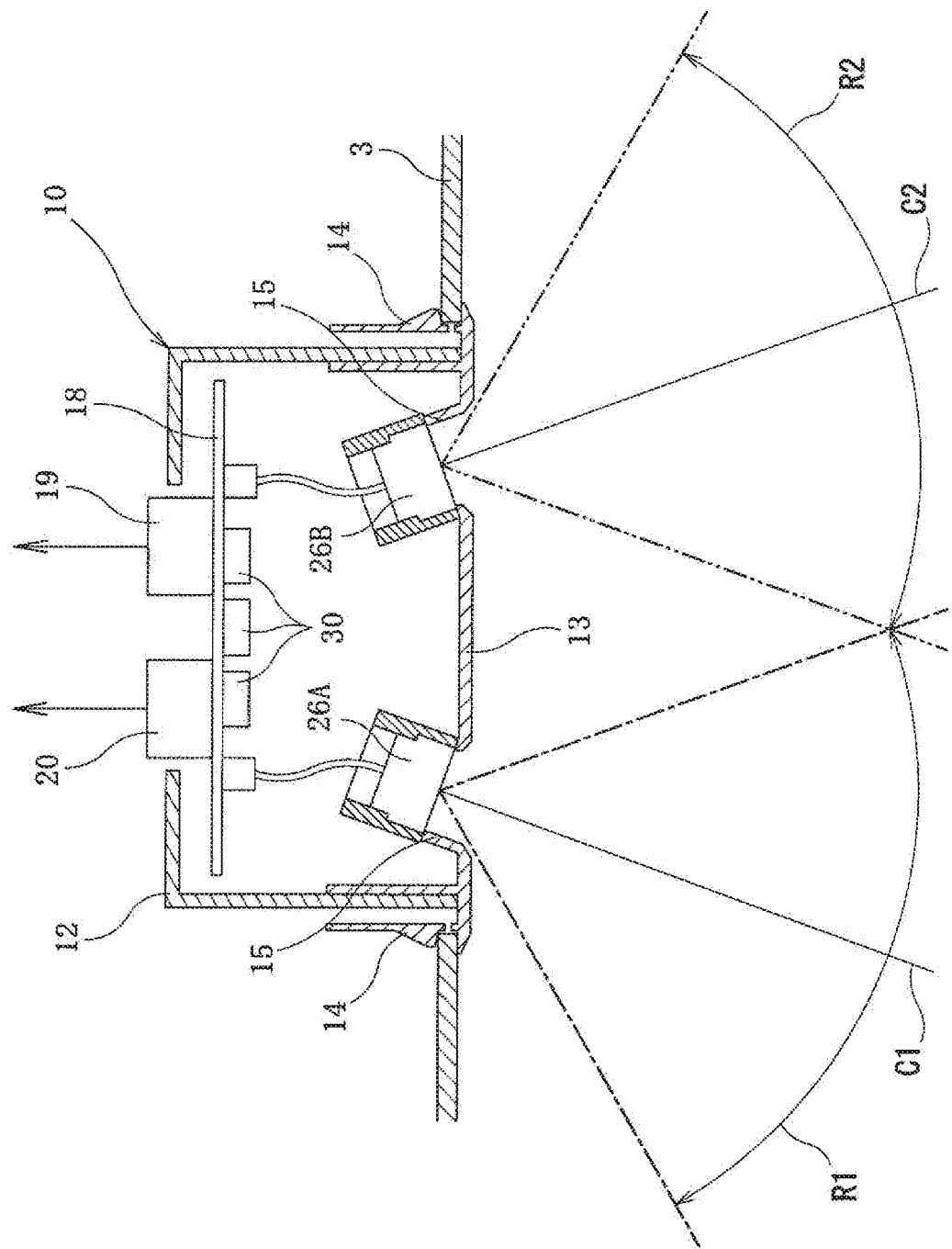

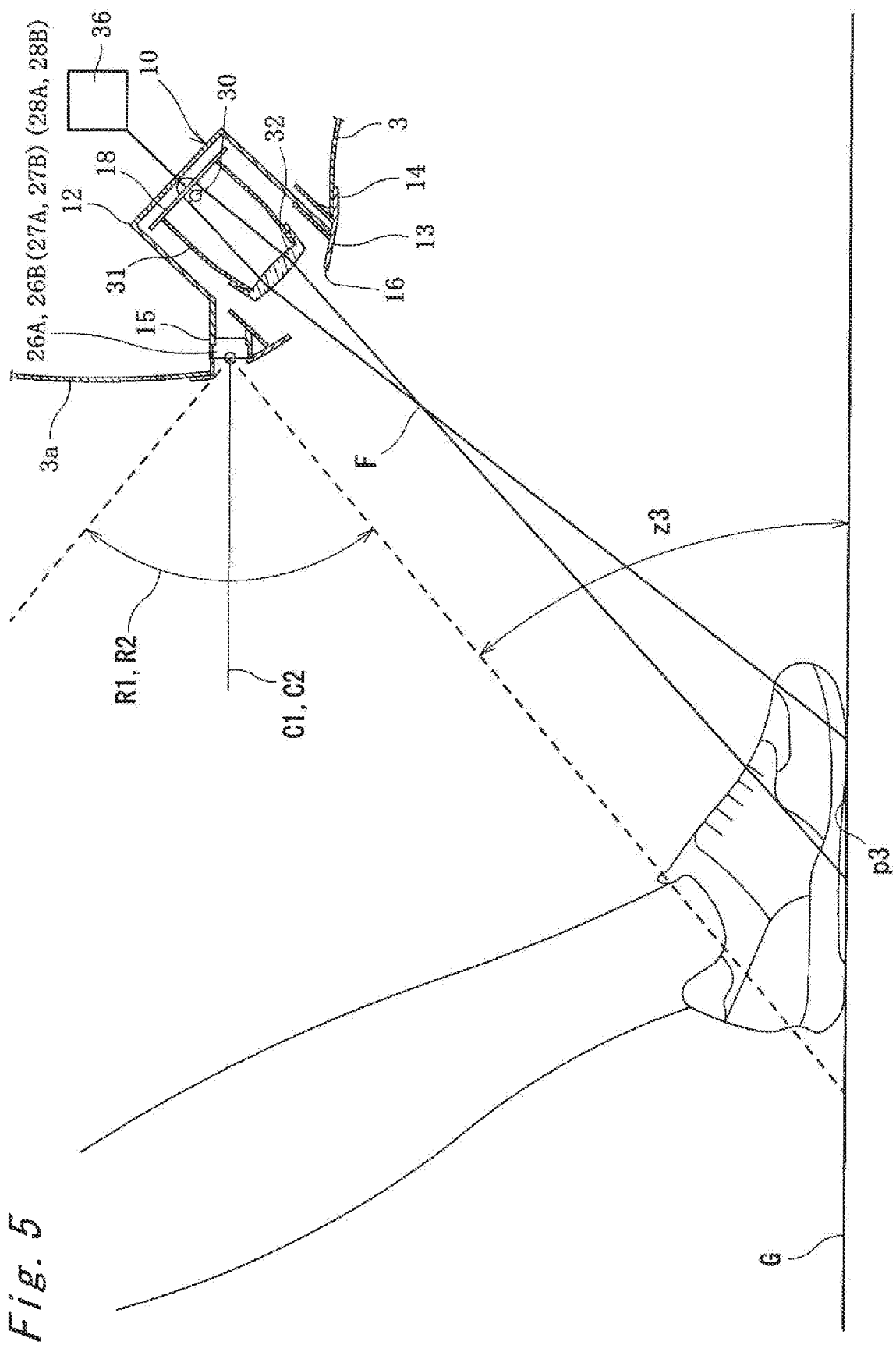

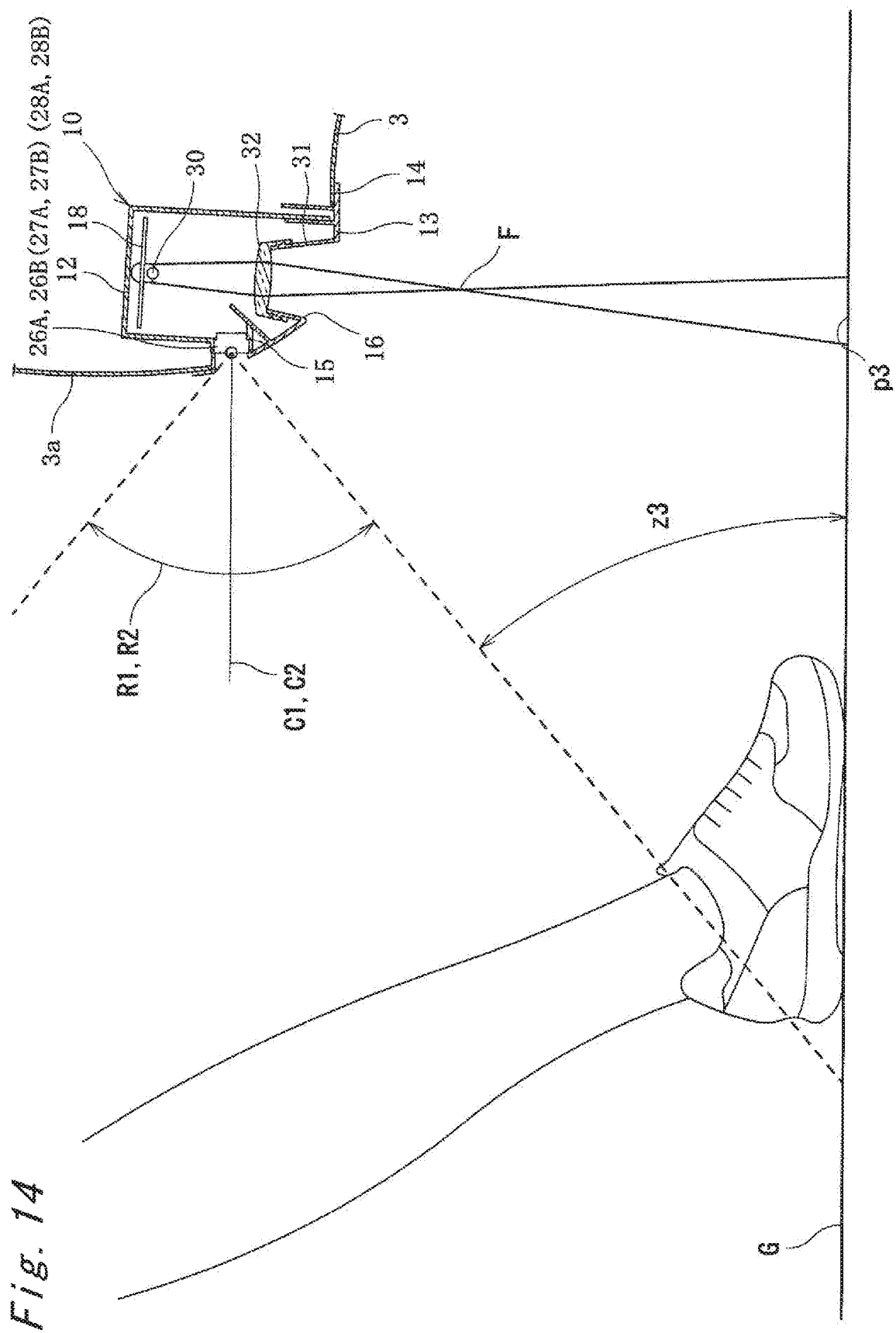

DOOR OPENING AND CLOSING DEVICE

CROSS-REFERENCE TO RELATED APPLICATIONS

This is a national stage application in the United States of International application No. PCT/JP2017/035813 with an international filing date of Oct. 2, 2017, which claims priority of Japanese Patent Application No. 2016-196481 filed on Oct. 4, 2016 the contents of which are incorporated herein by reference.

TECHNICAL FIELD

The present invention relates to a door opening and closing device.

BACKGROUND ART

A vehicle is mounted with a door opening and closing device capable of automatically opening and closing the door with which the user having baggage in both hands does not touch the door handle. JP 5643129 A discloses a door opening and closing device that opens and closes a door by detecting a movement of the user set by a ranging sensor. JP 2014-530309 A discloses a door opening and closing device that irradiates the ground with optical light-display means so as to prompt the user to make a set movement.

SUMMARY OF THE INVENTION

Problems to be Solved by the Invention

However, no consideration is taken for the door opening and closing devices of JP 5643129 A and JP 2014-530309 A in terms of the surroundings where the vehicle is parked. Thus, for example, if there is a puddle around the door, the user may step into the puddle when making a set movement.

It is an object of the present invention to provide a door opening and closing device capable of executing opening and closing control of the door in response to the surroundings of the door.

Means for Solving the Problems

The present invention provides a door opening and closing device including: a door drive unit capable of opening and closing a door with respect to a vehicle body; a detection means for detecting a subject present in an approach area set around the door; a measurement unit that measures a distance from the detection means to the subject based on the detection result of the detection means; a determination unit that determines whether the subject has stopped in the approach area based on the measurement result of the measurement unit; a setting unit that sets in the approach area a trigger zone to drive the door drive unit on the basis of a separation distance from the detection means to the stopped position measured by the measurement unit when the determination unit determines a stoppage of the subject; and a control means for starting control to drive the door drive unit when the subject is determined to have moved into the trigger zone based on the measurement result of the measurement unit.

According to this door opening and closing device; since the trigger zone is set on the basis of the stopped position of the subject (user) having entered the approach area, the position of the trigger zone can be changed when the user changes the stopped position (standing position). Hence, for example, even if there is a puddle in the approach area, the trigger zone can be set at a position avoiding the puddle, and the user can thus open and close the door without stepping into the puddle. Even when there are walls or obstacles in the approach area, the user stands at a position avoiding the walls and the obstacles, and hence the position of the trigger zone is changed, thereby allowing the door to be opened and closed reliably. In this manner, since the opening and closing control of the door can be executed in response to the surroundings of the door, the user convenience can be improved.

With the door opening and closing device of the present invention, the position of the trigger zone can be changed when the user changes the position where he/she stands. Therefore, the position of the trigger zone can be changed in response to the surroundings of the door and the opening and closing control of the door can be executed, and therefore the user convenience can be improved.

BRIEF DESCRIPTION OF THE DRAWINGS

FIG. 4 is an enlarged sectional view of the door opening and closing device of FIG. 3;

FIG. 5 is an enlarged sectional view of the door opening and closing device of FIG. 1;

FIG. 14 is an enlarged sectional view showing a display position of the second embodiment.

EMBODIMENTS OF THE INVENTION

Hereinafter, the embodiment the present invention will be described with reference to the drawings.

First Embodiment

Figure 1:
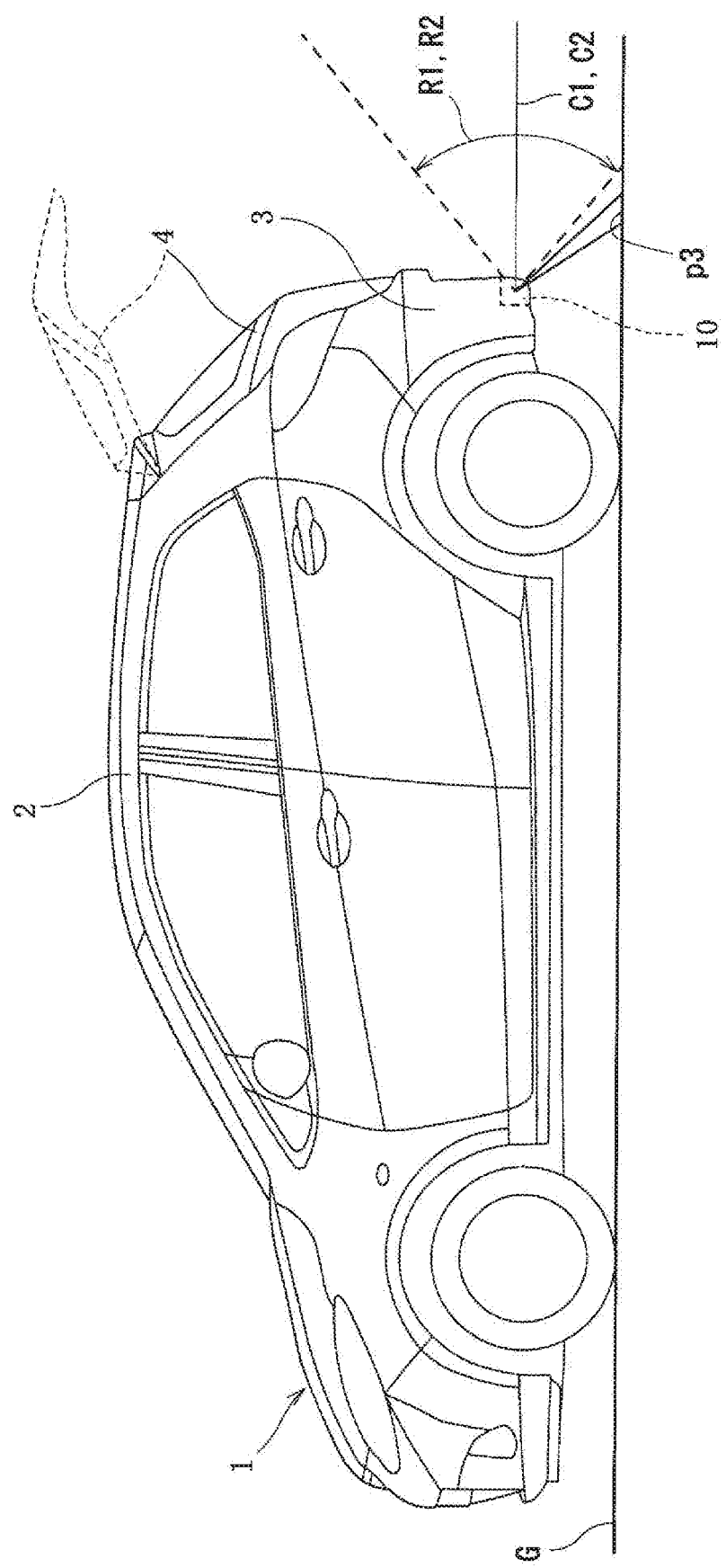
FIG. 1 is a side view showing a door opening and closing device of the present embodiment mounted on a vehicle.
Figure 2:
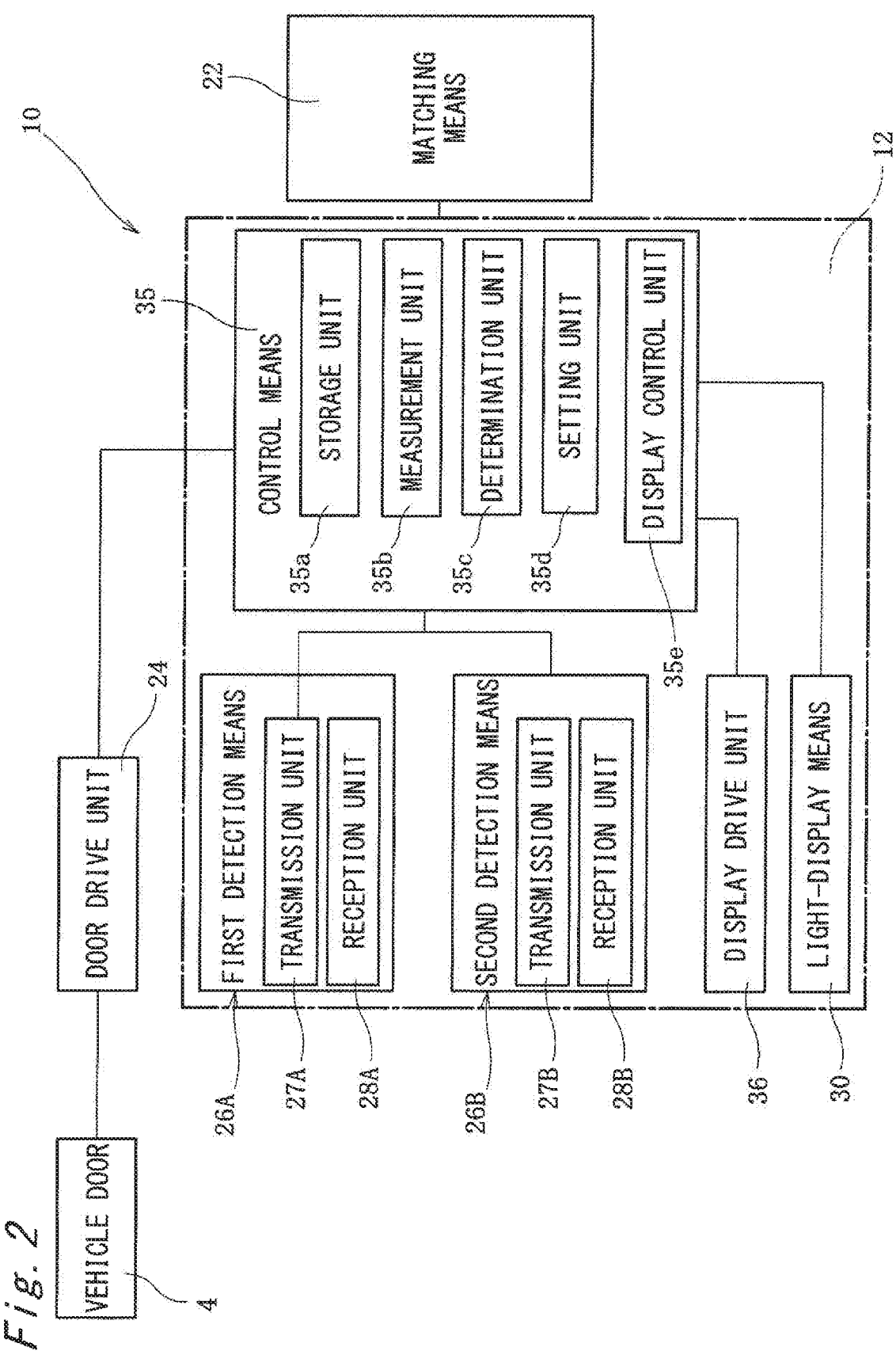
FIG. 2 is a block diagram showing a configuration of a door opening and closing device according to a first embodiment.
Figure 3:
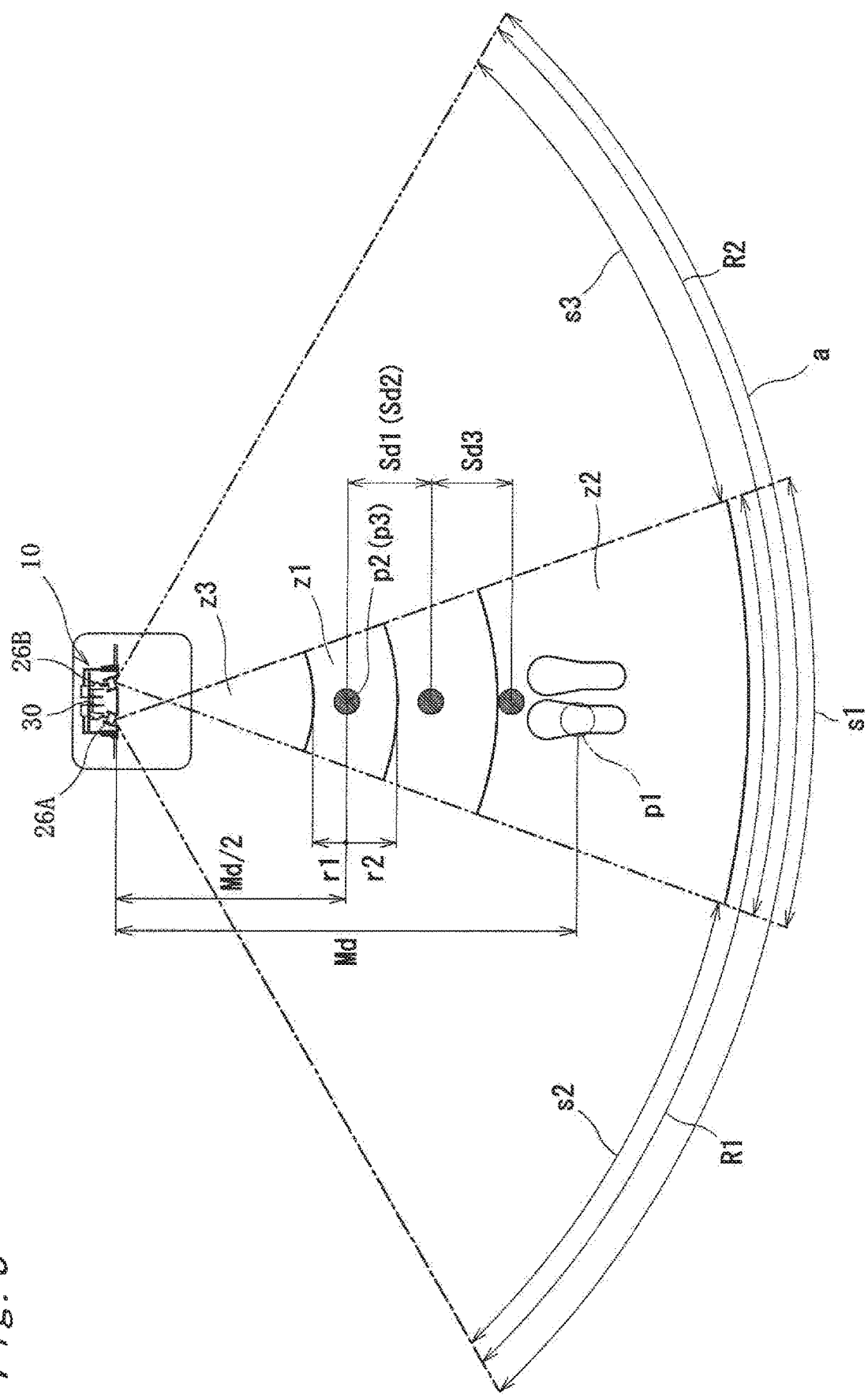
FIG. 3 is a plan view showing a relationship between a detection range and a display position of the door opening and closing device according to the first embodiment.

FIG. 1 and FIG. 2 show a vehicle 1 in which a door opening and closing device 10 of the first embodiment is disposed. If the user makes a set movement around a door 4, the door opening and closing device 10 automatically drives the door 4 to open or close without causing the user to lase his/her hand. In the present embodiment, the user convenience is improved by, with a stopped position p1 of the user taking as a reference, as shown in FIG. 3, changing a trigger zone z1 for starting control of driving the door 4. The door 4 is not limited to a hatchback door but may be a hinged door or a sliding door for getting in and out.

As shown in FIG. 2, the door opening and closing device 10 includes a matching means 22, a door drive unit 24, a pair of detection sensors 26A and 26B, an LED 30, and a controller (control means) 35. As shown in FIG. 3, in the door opening and closing device 10, an approach area "a" for detecting a subject is set around the door 4 by the pair of detection sensors 26A and 26B. The subject includes a user who possesses a specific electronic key (not illustrated), a person other than the user, an animal other than a human, an obstacle, and the like. The obstacle includes a piece of movable baggage, an immovable structure (a wall or a pillar), another vehicle, and the like.

In the door opening and closing device 10, when the detection sensors 26A and 26B detect entry of a subject into the approach area "a", the matching means 22 determines whether or not the subject is the user. Here, the entry of a subject means a state in which an undetected subject is detected for the first time. When the detected subject is the user, the controller 35 determines the movement of the user based on the detection result of the detection sensors 26A and 26B, and controls the opening and closing of the door 4 by the door drive unit 24. In addition, the controller 35 performs predetermined display by the LED 30 in order to prompt the user to make a set movement.

Detail of Door Opening And Closing Device

The detection sensors 26A and 26B, the LED 30, and the controller 35 are housed in a casing 12 and are disposed at the lower center portion of a rear bumper 3 of a vehicle body 2. The matching means 22 and the door drive unit 24 are directly disposed in the vehicle 1 without being housed in the casing 12.

With reference to FIG. 4 and FIG. 5, the casing 12 is a box having an opening at one end, and includes a cover 13 that covers the opening. The cover 13 is provided with a fixing portion 14 for fixing to the rear bumper 3 and a horizontally-opening, substantially-cylindrical sensor attachment portion 15. The sensor attachment portions 15 and 15 are opened in an inclined manner towards both outer sides so that their axes are gradually separated. Further, the cover 13 is provided with an opening 16 through which the light of the LED 30 is transmitted to the outside of the easing 12.

In the casing 12, a control board 18 is attached so as to face the opening 16. On the control board 18, a connector 19 for connecting to the matching means 22 and a connector 20 for connecting to the constant voltage power supply are mounted. These connectors 19 and 20 are exposed to the outside from the bottom of the casing 12. Further, on the control board 18, the plurality of LEDs 30 and the controller 35 are mounted.

As shown in FIG. 2, the matching means 22 performs key authentication with an electronic key, thereby determining whether or not the subject detected by the detection sensors 26A and 26B is the user. The matching means 22 is communicably connected with the controller 35 via a communication cable and is wirelessly and communicably connected to the electronic key possessed by the user. As the matching means 22, an upper-level ECU (Electronic Control Unit) mounted on the vehicle 1 is used. The upper-level ECU is to control electronic devices of the vehicle 1 including the door opening and closing device 10. However, the function of the matching means 22 may be performed by the controller 35.

Explaining in detail the authentication process, the matching means 22 transmits an authentication code request signal, and the electronic key having received it transmits an authentication code, thereby comparing the received authentication code with a stored normal code. When the authentication code and the normal code match, the matching means 22 identifies the user and outputs, to the controller 35, a door control signal for starting the control including the opening and closing determination of the door 4. On the other hand, when the authentication code and the normal code do not match, the matching means 22 identifies another person than the user and does not output the door control signal. If it is impossible to receive the authentication code, the matching means 22 identifies an animal (including a human) other than the user or an obstacle, and does not output the door control signal.

The door drive unit 24 is a mechanism including a drive device (a motor, a gear mechanism, a damper, and the like) that allows the door 4 hinged to the vehicle body 2 to rotate in the opening direction and the closing direction. The door drive unit 24 is communicably connected with the controller 35 via a communication cable. It is to be noted that the door drive unit 24 and the controller 35 may be wirelessly connected.

As shown in FIG. 2 to FIG. 4, the detection sensors 26A and 26B are detection means for detecting a subject. The detection sensors 26A and 26B are attached to the sensor attachment portions 15 and 15 of the cover 13, respectively, and are communicably connected to the control board 18 via lead wires. Each of the first detection sensor (first detection means) 26A and the second detection sensor (second detection means) 26B can use an ultrasonic sensor. With reference to FIG. 2, the detection sensors 26A and 26B include transmission units 27A and 27B that transmit a radio signal (ultrasonic wave) of a predetermined frequency and reception units 28A and 28B that receive a signal including a reflected wave (reflected signal) of a radio signal. It should be noted that the detection sensors 26A and 26B may be of a form in which the transmission units 27A and 27B and the reception units 28A and 28B are individually disposed or may be of a form in which the transmission unit and the reception unit are provided as single transmission and reception unit. The setting of the detection range by the detection sensors 26A and 26B will be described later in detail.

The LED 30 is a light-display means that performs optical display (operation mark) on the ground G as to guide the user to a set position. Three LEDs 30 are mounted on the control board 18 and illuminate the ground through the opening 16 so that the user can visually recognize not only when the surrounding of the vehicle 1 is dark but also when the surrounding of the vehicle 1 is bright. A tubular lens attachment portion 31 is disposed on the control board 18, and a lens 32 is disposed in the lens attachment portion 31. The lens 32 collects light of the LED 30 and irradiates the ground G.

As shown in FIG. 2, the controller 35 is a control means for controlling the door opening and closing device 10. The controller 35 is provided with a storage unit 35a that stores a control program, setting data such as threshold values and determination values used in the control program, a data table for calculating the distance from the detection results of the detection sensors 26A and 26B, and the like. In addition, the controller 35 also has functions as a measurement unit 35b, a determination unit 35c, a setting unit 35d, and a display control unit 35*e*. While in the present embodiment, one microcomputer is used as the controller 35, the measurement unit 35*b*, the determination unit 35*c*, the setting unit 35*d*, and the display control unit 35*e* may be constituted by individual control means.

The controller 35 can determine a presence of the subject in the approach area "a" by receiving a reflected wave by the reception units 28A and 28B. Further, when the reception units 28A and 28B do not receive a reflected wave, the controller 35 can determine that the subject is not present in the approach area "a". Further, the controller 35 can determine whether or not the user has moved based on the detection results of the detection sensors 26A and 26B and the past detection results stored in the storage unit 35*a*. Then, when determining that the user has made a set movement, the controller 35 drives the door drive unit 24 to open or close.

Specifically, the controller 35 as the measurement unit 35*b* measures (calculates) the distance from the detection sensors 26A and 26B to the subject. The reception time from when the transmission units 27A and 27B transmit a radio signal to when the reception units 28A and 28B receive a reflected wave becomes longer as the distance from the detection sensors 26A and 26B to the subject becomes longer. Therefore, by measuring the reception time corresponding to the distance, the measurement unit 35*b* can measure the distance from the detection sensors 26A and 26B to the subject. That is, the measurement unit 35*b* and the detection sensor 26A constitute one ranging sensor, and the measurement unit 35*b* and the detection sensor 26B constitute one ranging sensor.

The measurement unit 35*b* measures the distance after the matching means 22 authenticates the user. A measurement result M by the measurement unit 35*b* is stored in the storage unit 35*a* as distance information D. This distance information D is the detection result of each of the detection sensors 26A and 26B, and is stored in the storage unit 35*a* by the set number of times (for example, 10 times). When the storage amount exceeds the set number of times, the distance information D is erased from the storage unit 35*a* in order from the oldest.

The controller 35 as the determination unit 35*c* determines whether or not the user has stopped in the approach area "a" based on the measurement result M of the measurement unit 35*b*. Specifically, when the user moves, the amount of change between the current measurement result M and previous distance information D1 increases as the movement distance increases. On the other hand, when the user stops, the amount of change between the measurement result M and the distance information D has little difference or becomes equal. Thus, the determination unit 35*c* determines whether the user has moved or stopped based on the amount of change between the measurement result M by the measurement unit 35*b* and the distance information D of the storage unit 35*a* and a preset determination value J.

The determination unit 35*c* of the present embodiment compares the measurement result M by the measurement unit 33*b* with each of the newest three pieces (D1 to D3) of the distance information D. Then, in a case where all the differences amounts of change) are equal to or less than the determination value J (for example, 5 cm), the determination unit 35*c* determines that the user is stopped.

The controller 35 as the setting unit 35*d* sets the trigger zone z1 for driving the door drive unit 24 in the approach area "a" when the determination unit 35*c* determines that the user is stopped. The setting unit 35*d* sets a predetermined position in a separation distance Md as a trigger position p2 on the basis of the separation distance Md from the detection sensors 26A and 26B to the stopped position p1 of the user. Further, the setting unit 35*d* sets, as the trigger zone z1 including the trigger position p2, an area in which a first range r1 that is closer to the door 4 than the trigger position p2 and a second range r2 that is away from the door 4 than the trigger position p2 are brought together.

The controller 33 as the display control unit 35*e* switches the LED 30 among a lighted state, a blinking state, and a lighted-out state. For example, when the setting unit 35*d* sets the trigger zone z1, the display control unit 35*e* switches the LED 30 from the lighted-out state to the blinking state. If it is determined that the user has moved to the trigger zone z1, the display control unit 35*e* switches the LED 30 from the blinking state to the lighted state. In this way, the display control unit 35*e* prompts the user to move to the trigger zone 21 and notifies of the movement timing. It should be noted that the notification of the movement timing may be accompanied with a sound output.

The display control unit 35*c* of the present embodiment changes a display position p3 of the LED 30 by a display drive unit 36 in accordance with the position of the trigger zone z1 set by the setting unit 35*d*. The display drive unit 36 is a mechanism including a motor, a gear mechanism, and the like disposed inside the casing 12. The display drive unit 36 vertically rotates the control board 18 in FIG. 5 and rotates clockwise and counterclockwise the control board 18 in FIG. 4. As a result, the display position p3 of the LED 30 is changed in a direction getting close to or away from the casing 12 in FIG. 3, and is changed right and left in FIG. 3. It is to be noted that FIG. 5 shows a state in which a first portion close to the vehicle body 2 is taken as the display position p3 and FIG. 3 shows a state in which a second portion further away from the vehicle body 2 than the first portion is taken as the display position p3. In the present embodiment, the display drive unit 36 moves a focus F of the lens 32 so that the display position p3 of the LED 30 is set to the trigger position p2 (in the trigger zone z1).

Next, with reference to FIG. 3, the detection ranges by the detection sensors 26A and 26B and the control by the controller 35 will be described.

Details of Detection Range

As shown in FIG. 3 to FIG. 5, the transmission units 27A and 27B of the detection sensors 26A and 26B transmit radio signals so as to spread radially. With reference to FIG. 5, output centers (detection center axes) C1 and C2 of the radio signals of the transmission units 27A and 27B are set, so as to be output in the horizontal direction from the vehicle body 2. The horizontal direction is a direction along the ground G where the vehicle is parked. With reference to FIG. 4, the output centers C1 and C2 of the transmission units 27A and 27B are set so as to be inclined away from each other.

Conical ranges in which the transmission units 27A and 27B output radio signals are detection ranges R1 and R2 of the detection sensors 26A and 26B, respectively. The entire range with these detection ranges R1 and R2 combined together is the approach area "a". The inclination angles of the output centers C1 and C2 of the detection, sensors 26A and 26B are angles at which a part of the detection range R1 and a part of the detection range R2 overlap on the center side of the vehicle body 2. This portion where the detection ranges R1 and R2 overlap constitutes one operation section s1.

In the operation section s1, both of the first detection sensor 26A and the second detection sensor 26B can detect the subject. Therefore, when both of the detection sensors 26A and 26B receive the reflected wave, the controller 35 can determine that the detection target is present in the operation section s1. In a first section s2 of the detection range R1 excluding the operation section s1, only the first detection sensor 26A can detect the subject. Therefore, when only the first detection sensor 26A receives the reflected wave, the controller 35 can determine that the subject is present in the first section s2. In a second section s3 of the detection range R2 excluding the operation section s1, only the second detection sensor 26B can detect the subject. Therefore, when only the second detection sensor 26B receives the reflected wave, the controller 35 can determine that the subject is present in the second section s3.

In this manner, by overlapping a part of the first detection range R1 of the first detection sensor 26A and a part of the second detection range R2 of the second detection sensor 26B, the specific operation section s1 with a limited range in a width direction can be set without using a special device. Therefore, it is possible to stably and highly accurately detect the movement of the user, and to reliably prevent erroneous detection.

In addition, since the detection sensors 26A and 26B are disposed on the vehicle body 2, the reference (distance) at the time of detecting the subject is the same, regardless of whether the door 4 is controlled to be opened or closed. Therefore, it is possible to reliably prevent erroneous detection by the detection sensors 26A and 26B, and to quickly and highly accurately detect the movement of the user. Further, since the output centers C1 and C2 are inclined outwards from each other so as not to intersect with each other, the detection sensors 26A and 26B can be easily assembled to the casing 12.

Details of Operation Section

The operation section s1 is divided into two or more operation detection zones in accordance with the distance from the detection sensors 26A and 26B. In the present embodiment, the trigger zone z1 close to the vehicle body 2 and a start zone z2 away from the vehicle body 2 are provided. The trigger zone z1 is a portion where the detection sensors 26A and 26B detect that the user has approached the vehicle body 2 and is set by the setting unit 35d based on the stopped position p1 of the user as described above. The start zone z2 is a position away from the vehicle body 2 than the trigger zone z1 and is a position where the door 4 does not substantially collide with the user when opened and closed.

For example, it is assumed that the detectable distance of the detection sensors 26A and 26B in the direction away from the vehicle body 2 is 120 cm. In this case, the start zone z2 is a range from a position 50 cm away from the detection sensors 26A and 26B to a position 120 cm away. In the present embodiment, unless the user stops in the start zone z2, the trigger zone z1 is not set. If the user stops in the start zone z2, the setting unit 35d sets as the trigger position p2 an intermediate (Md/2) of the separation distance Md up to the stopped position p1. Next, the first range r1 (10 cm) and the second range r2 (15 cm) that include the trigger position p2 are set as the trigger zone z1. It should be noted that the trigger position p2 is not limited to the intermediate position of the separation distance Md and can be set as desired.

As described above, the controller 35 as the measurement unit 35b can measure the distance to the subject based on the length of time from the transmission of the radio signal to the reception of the reflection wave. Therefore, the controller 35 can determine as to which of the zones z1 and z2 of the operation section s1 the subject is present, based on the distance measured by the measurement unit 35b. In addition, the controller 35 can determine the movement distance by comparing the measurement result M of the measurement unit 35b with the distance information D1 stored in the storage unit 35a. Of course, the controller 35 can also determine the distance between the set trigger position p2 and the user.

With reference to FIG. 5, since the detection ranges R1 and R2 of the detection sensors 26A and 26B are radial, a small-subject, undetectable zone z3 is formed under the detection ranges R1 and R2 in the area close to the vehicle body 2. If the subject is present only in this zone z3, the subject can not be detected by the detection sensors 26A and 26B. However, the state in which the user has moved to the zone z3 can be detected by the detection sensors 26A and 26B. This is because the user's body is located in the detection ranges R1 and R2 of the detection sensors 26A and 26B even if the user's foot is located in the zone z3. That is, if even a part of the subject is located in the detection ranges R1 and R2, the detection sensors 26A and 26B can detect the subject.

Details of Control by Controller

The automatic opening and closing control of the door 4 by the controller 35 is started when the vehicle 1 is parked and the engine is stopped. Then, the controller 35 drives the door 4 when the user makes the following set movement.

In order to open the closed door 4, the user enters the approach area "a" and stops at the start zone z2 (first action). Next, the user moves forward towards the trigger zone z1 (display position p3) that is blinkingly displayed by the LED 30 and steps on the trigger zone z1 (second action). When the blinking display by the LED 30 turns to a lighted display, the user moves backward by a set distance Sd1 (for example, 25 cm) towards the start zone z2 (third action). When determining that the user has made the set movement, the controller 35 drives the door drive unit 24 to open the door 4.

In order to close the opened door 4, the user moves backward one more step than the case where the door 4 is driven to open. That is, the user enters the approach area "a" and stops at the start zone z2 (first action). Subsequently, the user moves forward towards the trigger zone z1 that is blinkingly displayed by the LED 30 and steps on the trigger zone z1 (second action). When the blinking display by the LED 30 turns to the lighted display, the user moves backward by a set distance Sd2 (for example, 25 cm) towards the start zone z2 (third action) and then further moves backward by a set distance Sd3 (for example, 10 cm (35 cm from the trigger position p2)) (fourth action). When determining that the user has made the set movement, the controller 35 drives the door drive unit 24 to close the door 4.

Figure 6A:
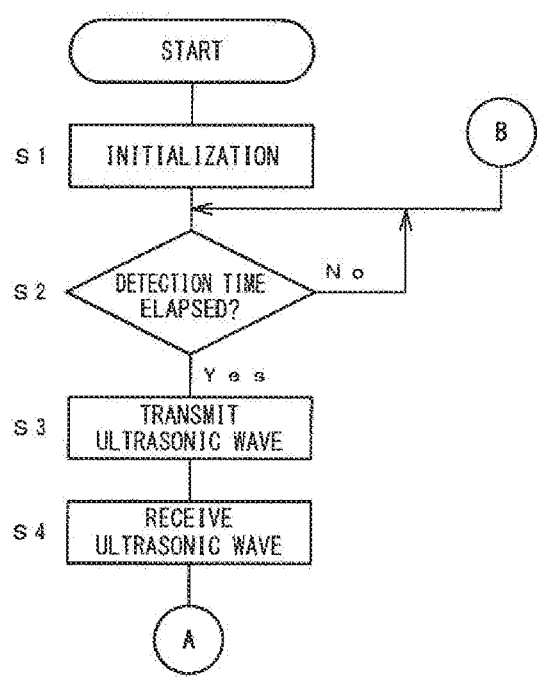
FIG. 6A is a flowchart showing control by the control means.
Figure 6B:
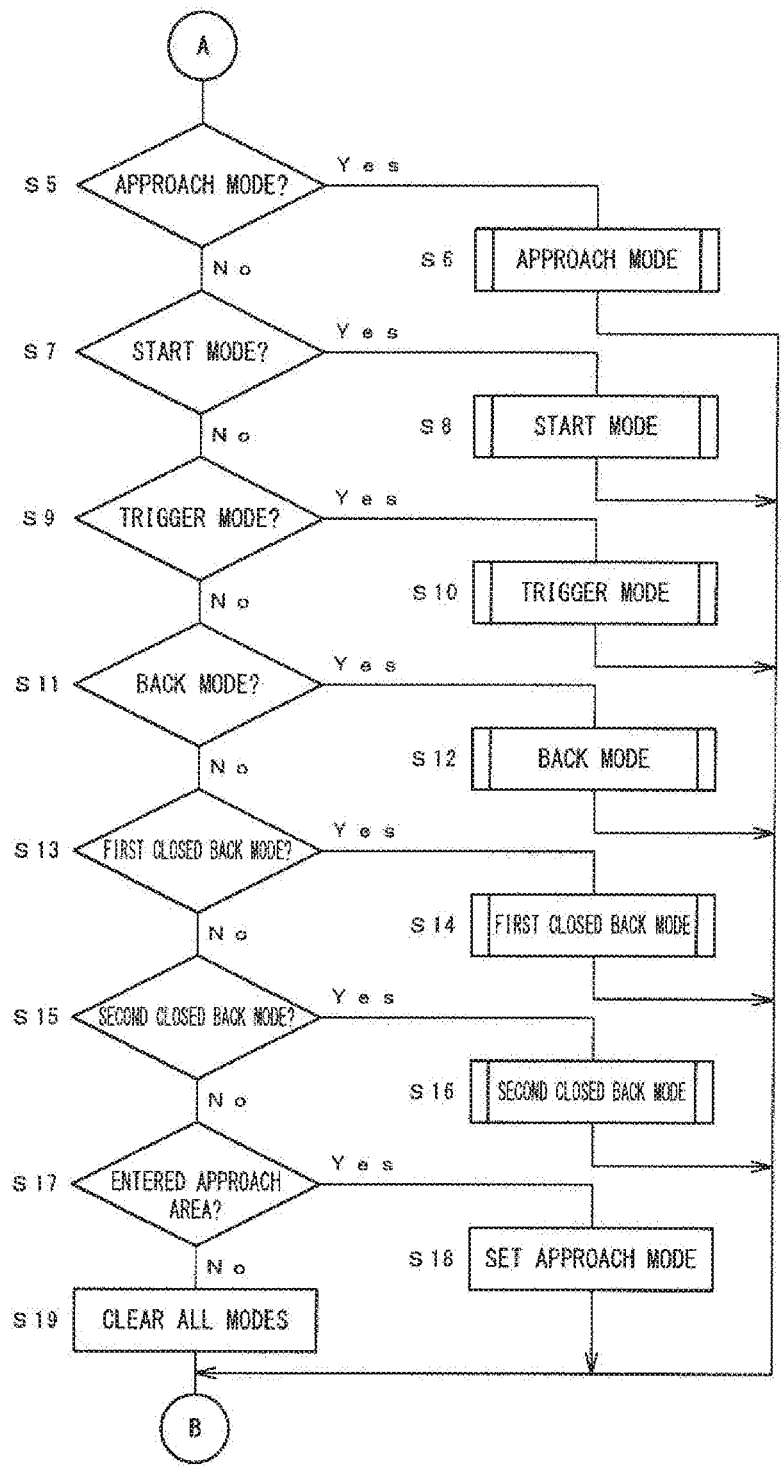
FIG. 6B is a flowchart showing the continuation of the control of FIG. 6A.

In order to detect such a movement of the user and prompt the user to make a predetermined movement, as shown in FIG. 6B, first to sixth modes are set in the control of the controller 35. In an approach mode (step S6), which is the first mode, it is matched whether or not the subject entered the approach area "a" is the user. In a start mode (step S8), which is the second mode, stoppage of the user in the start zone z2 is determined, and the trigger zone z1 is set based on the stopped position p1. In a trigger mode (step S10), which is the third mode, it is determined whether or not the user has moved to the trigger zone z1, and the opening control or closing control of the door 4 is started. In a back mode (step S12), which is the fourth mode, when opening the door 4, it is determined whether or not the user has moved backward and the door drive unit 21 is driven to open the door. A first closed back mode (step S14), which is the fifth, mode, and a second closed back mode (step S16), which is the sixth mode, are executed when the door 4 is closed. In the first closed back mode, it is determined whether or not the user has moved backward, and in the second closed back mode, it is determined whether or not the user having moved backward has further moved backward, thereby driving the door drive unit 24 to close the door.

Next, the control by the controller 35 will be described further in detail in accordance with the flowcharts of FIG. 6A to FIG. 12. A counter N used in FIG. 7 to FIG. 12 is to count the following.

Counter Na: Number of times of detection of the subject in the approach area "a"

Counter Nb: Number of times for which a smart entry authentication does not match Counter Nc: Number of times for which the user can not be detected in the start zone z2

Counter Nd: Number of times for which the user can not be detected in the trigger zone z1

Counter Ne: Number of times for which the user's backward movement can not be detected Counter Nf: Number of times for which the user's backward move-lent can not be detected Counter Ng: Number of times for which the user's backward movement again can not be detected Main Flow As shown in FIG. 6A, when the engine of the vehicle 1 is stopped, the controller 35 initializes itself in step S1 and waits until the detection time by the detection sensors 26A and 26B comes in step S2. Here, the measurement of the detection time is performed by a built-in timer of the controller 35. The detection time is different between the case where the subject is present in the approach area "a" and the case where the subject is not present in the approach area "a", and the detection time in the case of presence is set to be shorter than that in the case of not present. For example, the detection is performed every 0.5 seconds in the case where the subject is not present, and the detection is performed every 0.05 seconds in the case where the subject is present.

After the detection time has elapsed, the transmission units 27A and 27B of the detection sensors 26A and 26B are caused to output radio signals (ultrasonic waves) in step S3, and then the reception units 28A and 28B of the detection sensors 26A and 26B receive reflected waves in step S4. It should be noted that the signal transmission and reception in steps S3 and S4 may be performed one by one by the pair of detection sensors 26A and 26B, or may be performed by the both at the same time. Thereafter, as shown in FIG. 6B, the controller 35 executes control in response to each situation.

In step S5, it is determined whether or not the approach mode has been set. If the approach mode has been set, the process proceeds to step S6, where the approach mode is executed, and the process proceeds to step S2 of FIG. 6A. If the approach mode has not been set, on the other hand, the process proceeds to step S7.

In step S7, it is determined whether or not the start mode has been set. If the start mode has been set, the process proceeds to step S8, where the start mode is executed, and the process proceeds to step S2 of FIG. 6A. If the start mode has not been set, on the other hand, the process proceeds to step S9.

In step S9, it is determined whether or not the trigger mode has been set. If the trigger mode has been set, the process proceeds to step S10, where the trigger mode is executed, and the process proceeds to step S2 of FIG. 6A. If the trigger mode has not been set, on the other hand, the process proceeds to step S11.

In step S11, it is determined whether or not the back mode has been set. If the back mode has been set, the process proceeds to step S12, where the back mode is executed, and the process proceeds to step S2 of FIG. 6A. If the back mode has not been set, on the other hand, the process proceeds to step S13.

In step S13, it is determined whether or not the first closed back mode has been set. If the first closed back mode has been set, the process proceeds to step S14, where the first closed back mode is executed, and the process proceeds to step S2 of FIG. 6A. If the first closed back mode has not been set, on the other hand, the process proceeds to step S15.

In step S15, it is determined whether or not the second closed back mode has been set. If the second closed back mode has been set, the process proceeds to step S16, where the second closed back mode is executed, and the process proceeds to step S2 of FIG. 6A. If the second closed hack mode has not been set, on the other hand, the process proceeds to step S17.

Step S17 is executed in a state of not being set to any of the modes described above. Step S17 is a state in which the subject has not been detected in the approach area "a", and the controller 35 determines whether the subject including the user has entered the approach area "a", based on the detection results of the detection sensors 26A and 26B. If the entry of the subject is detected, the process proceeds to step S18, where the approach mode is set, and the process proceeds to step S2 in FIG. 6A. If the entry of the subject is not detected, on the other hand, the process proceeds to step S19, where the mode setting is cleared, and the process proceeds to step S2 in FIG. 6A.

Approach Mode

Figure 7:
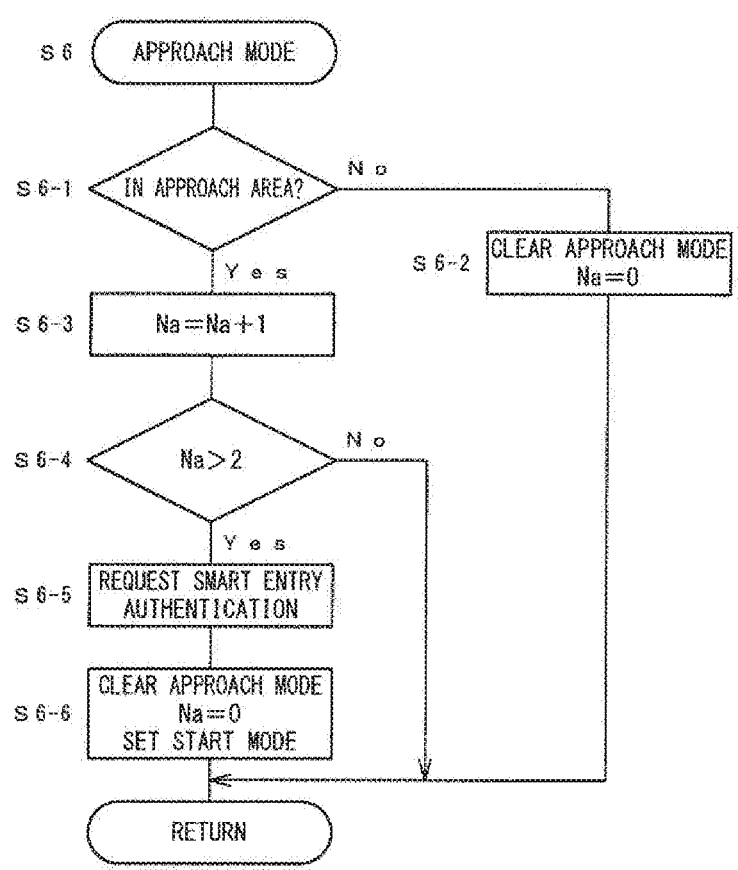
FIG. 7 is a flowchart showing an approach mode of FIG. 6B.

As shown in FIG. 7, in the approach mode of step S6, the controller 35 determines in step S6-1 whether or not the subject has entered the approach area "a". If the subject has not entered the approach area "a", the process proceeds to step S6-2, where the approach mode is cleared and also the counter Na, which is the number of times of detection of the subject, is cleared, and the process proceeds to the main flow. If the subject has entered the approach area "a", on the other hand, the process proceeds to step S6-3.

In step S6-3, 1 is added to the counter Na, and then it is determined in step S6-4 whether or not the counter Na has exceeded 2. If the counter Na has exceeded 2, the process proceeds to step S6-5. If the counter Na is 2 or less, the process proceeds directly to the main flow.

In step S6-5, a smart entry authentication request signal is output to the matching means 22. Due to this, the matching means 22 performs a transmission request of the authentication code to the electronic key, and compares the authentication code received from the electronic key with the registered normal code, thereby determining the presence or absence of the user. Next, in step S6-6, the approach mode is cleared, the counter Na is cleared, the start mode is set, and the process proceeds to the main flow.

As described above, the subject is detected in the approach area "a", before detecting the set movement of the user. In this manner, it is determined whether or not the user has approached and key authentication is performed. Therefore, since the detection of the movement of the user for opening and closing the door 4 can be performed quickly, the convenience can be improved.

Start Mode

Figure 8:
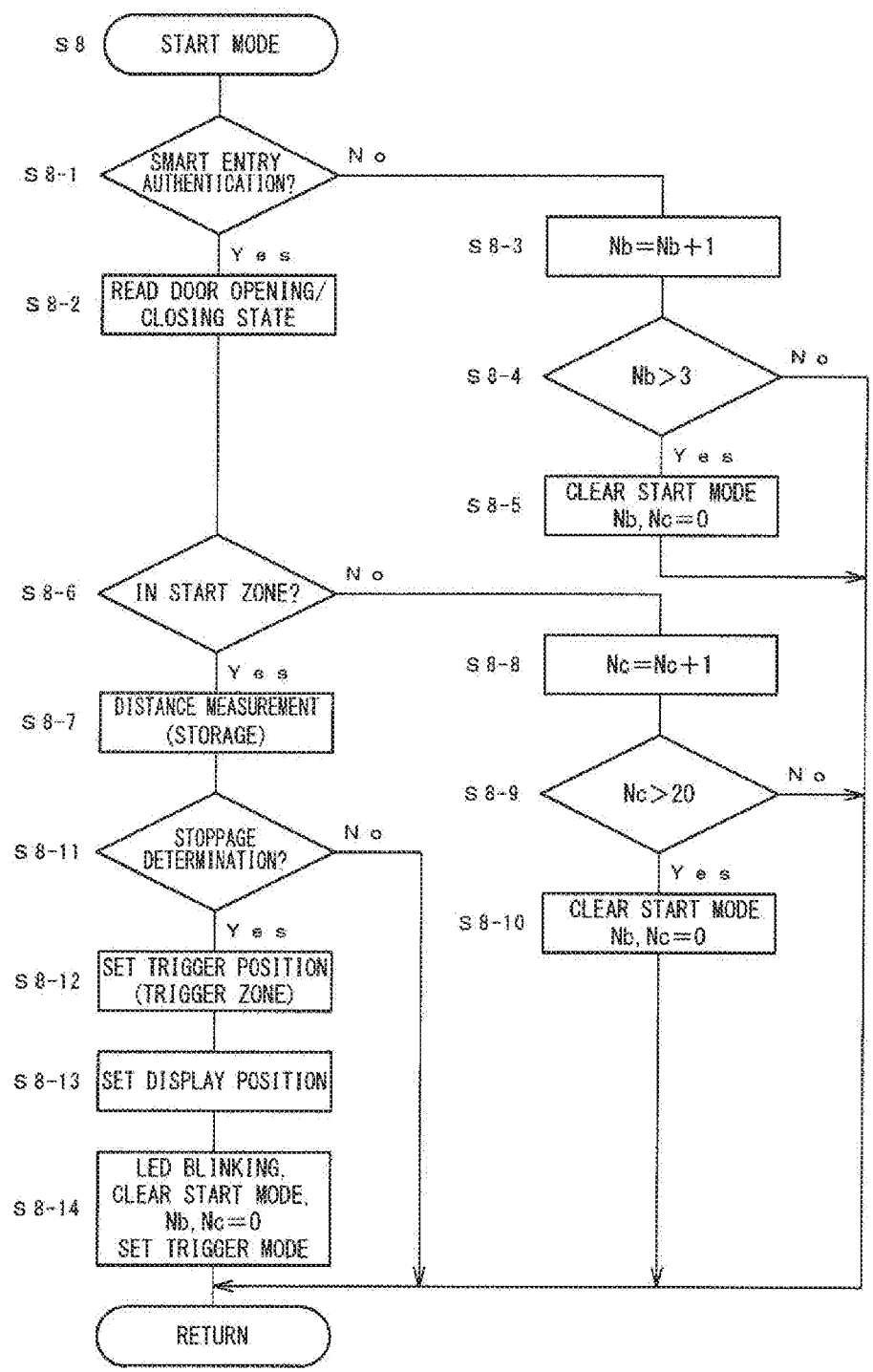
FIG. 8 is a flowchart showing a start mode of FIG. 6B.

As shown in FIG. 8, in the start mode of step S8, the controller 35 confirms in step S8-1 whether or not the smart entry authentication has been performed normally by reception from the matching means 22. If the smart entry authentication is performed normally and the user is present in the approach area "a", the process proceeds to step S8-2. If the smart entry authentication is not performed normally and the user is not present in the approach area "a", on the other hand, the process proceeds to step S8-3.

It is confirmed in step S8-2 whether the door 4 is in the open state or in the closed state by the signal from the door drive unit 24, and the process proceeds to step S8-6. The state of the door 4 may be confirmed in the back mods of step S12.

In step S8-3, 1 is added to the counter Nb, and then, it is determined in step S8-4 whether or not the counter Nb has exceeded 3. It the counter Nb exceeds 3, the process proceeds to step S8-5, where the start mode is cleared and the counters Nb and No are cleared, and the process proceeds to the main flow. If the counter Nb is 3 or less, on the other hand, the process proceeds directly to the main flow.

In step S8-6, it is determined whether or not the user is located in the start zone z2. If the user is present in the start zone z2, the process proceeds to step S8-7. If the user is not present in the start zone z2, on the other hand, the process proceeds to step S8-8.

In step S8-7, the distance to the laser is measured based on the detection results of the detection sensors 26A and 26B and the distance information D is stored in the storage unit 35a, and then the process proceeds to step S8-11.

In step S8-8, 1 is added to the counter Nc, and then it is determined in step S8-9 whether not the counter Nc has exceeded 20. If the counter Nc exceeds 20, the process proceeds to step S8-10, where the start mode is cleared and the counters Nb and Ne are cleared, and the process proceeds to the main flow. If the counter Nc is 20 or less, on the other hand, the process proceeds directly to the main flow.

In step S8-11, it is determined whether or not the user has stopped in the start zone z2 based on the measured distance information D. If stoppage of the user is determined, the process proceeds to step S8-12. If it is not possible to determine the stoppage of the user, on the other hand, the process proceeds directly to the main flow.

In step S8-12, the trigger zone z1 including the trigger position p2 is set based on the measurement result M (separation distance Md) measured this time, and then in step S8-13, the display drive unit 36 changes the display position p3 on the ground G by the LED 30. Next, in step S8-14, the display control unit 35e blinks the LED 30 and the start mode is cleared. Further, the counters Nb and Nc are cleared, the trigger mode is set, and the process proceeds to the main flow.

Trigger Mode

Figure 9:
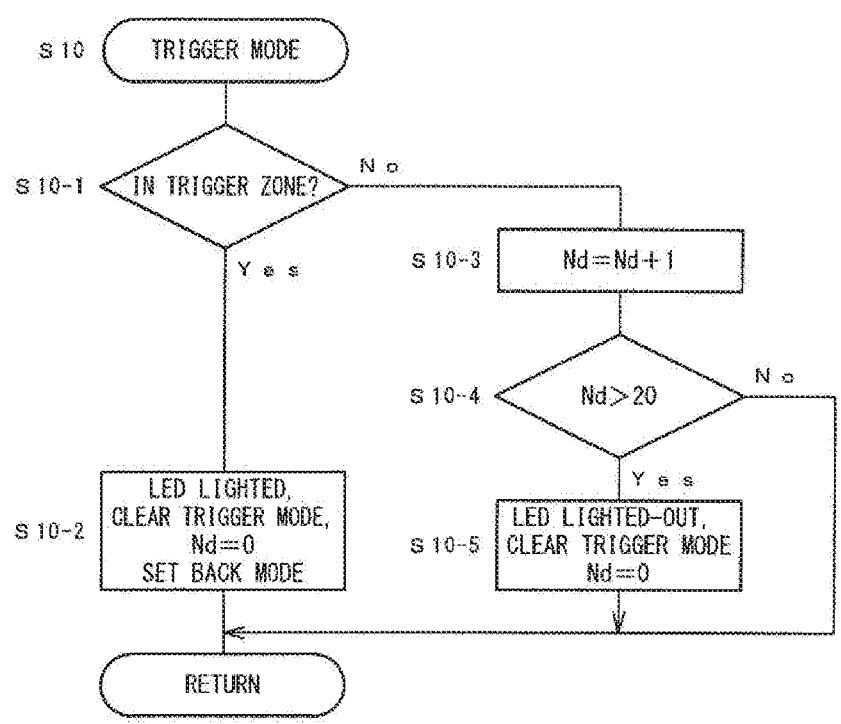
FIG. 9 is a flowchart showing a trigger mode of FIG. 6B.

As shown in FIG. 9, in the trigger mode of step S10, the controller 35 determines in step S10-1 whether or not the user has moved to the trigger zone z1 based on the measurement result M of the measurement unit 35b. If the user has entered the trigger zone z1, the process proceeds to step S10-2, where the LED 30 is lighted and the trigger mode is cleared. Further, the counter Nd is cleared, the back mode is set, and the process proceeds to the main flow.

If it is not possible to determine in step S10-1 the movement of the user to the trigger zone z1, 1 is added to the counter Nd in step S10-3, and then it is determined in step S10-4 whether or not the counter Nd has exceeded 20. If the counter Nd exceeds 20, the process proceeds to step S10-5, where the LED 30 is lighted out, the trigger mode is cleared, and the counter Nd is cleared, and the process proceeds to the main flow. If the counter Nd is 20 or less, on the other hand, the process proceeds directly to the main flow.

Back Mode

Figure 10:
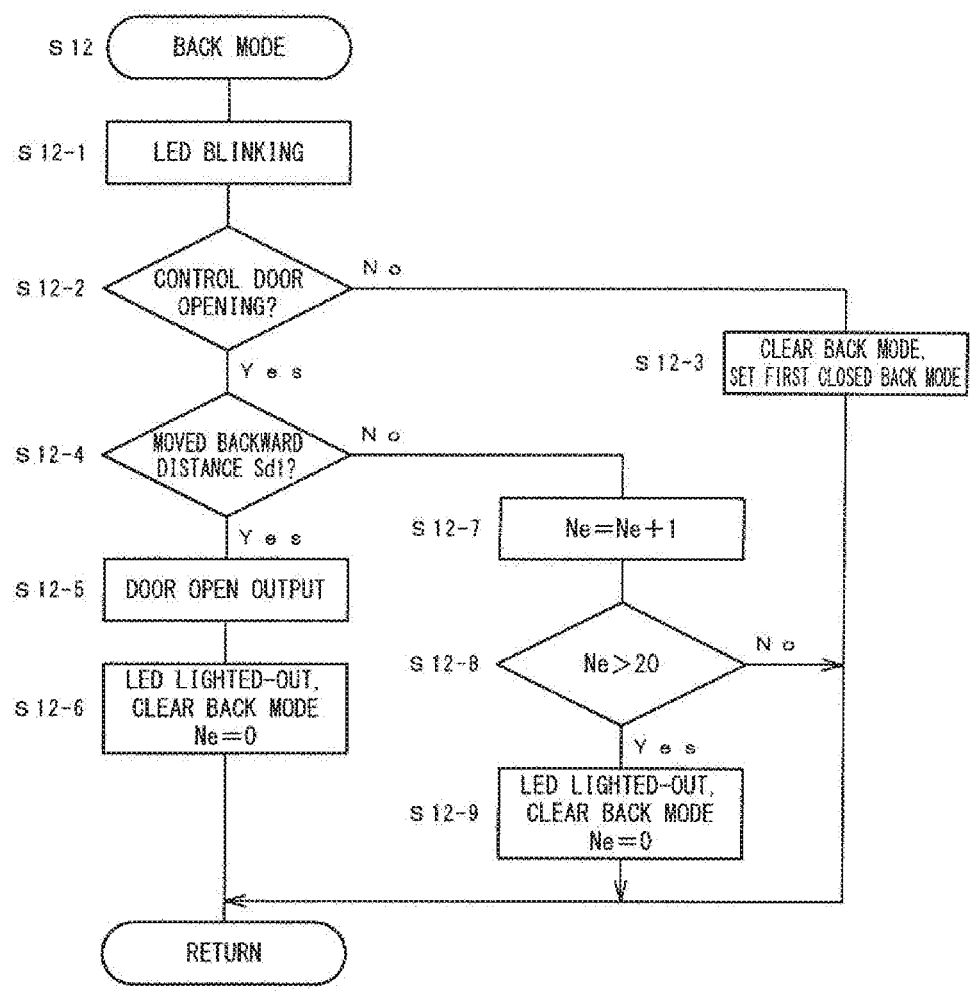
FIG. 10 is a flowchart showing the back mode of FIG. 6B.

As shown in FIG. 10, in the back mode of step S12, the controller 35 blinks the LED 30 in step S12-1, and then confirms in step S12-2 whether to control the door 4 to open or to close from the current open and close state of the door 4. If the door 4 is controlled to close, the process proceeds to step S12-3, where the back mode is cleared and the first closed back mode is set, and the process proceeds to the main flow. If the door 4 is controlled to open, on the other hand, the process proceeds to step S12-4.

It is determined in step S12-4 whether or not the user has moved towards the start zone z2 by the set distance Sd1 or more, based on the measurement result M of the measurement unit 35b. If the user has moved backward by the set distance Sd1 or more, the process proceeds to step S12-5. If the user has not moved backward by the set distance Sd1 or more, on the other hand, the process proceeds to step S12-7.

In step S12-5, by outputting an open signal of the door 4, the door drive unit 24 is driven to open the door 4. Next, in step S12-6, the LED 30 is lighted out, the back mode is cleared, the counter Ne is cleared, and the process proceeds to the main flow.

In step S12-7, 1 is added to the counter Ne, and then it is determined in step S12-8 whether or not the counter Ne has exceeded 20. If the counter Ne exceeds 20, the process proceeds to step S12-9, where the LED 30 is lighted out, the back mode is cleared, the counter Ne is cleared, and the process proceeds to the main flow. If the counter Ne is 20 or less, the process proceeds directly to the main flow.

First Closed Back Mode

Figure 11:
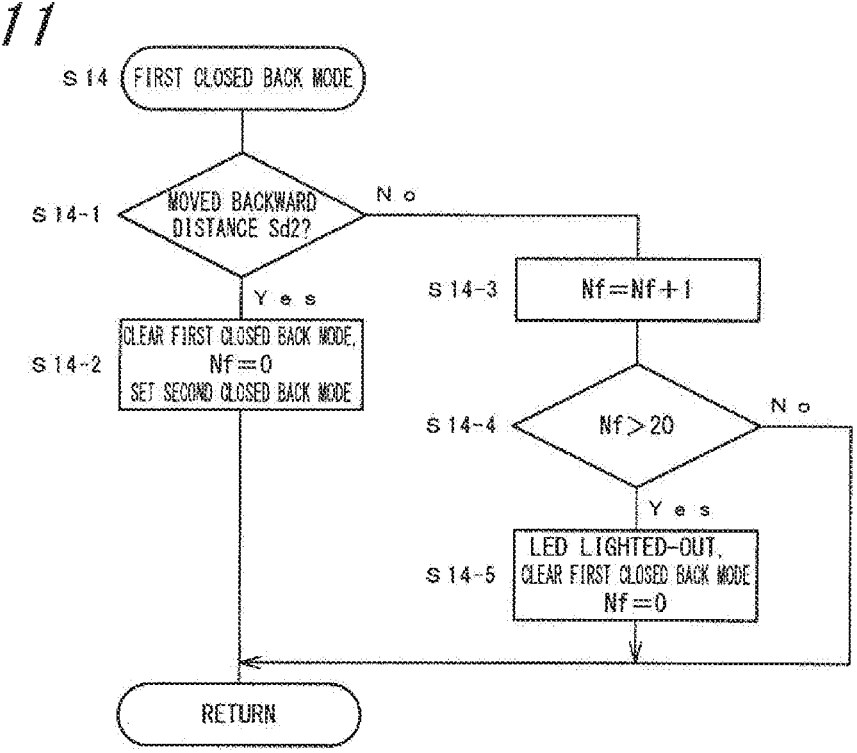
FIG. 11 is a flowchart showing a first closed back mode of FIG. 6B.

As shown in FIG. 11, in the first closed back mode of step S14, the controller 35 determines in step S14-1 whether or not the user has moved by the set distance Sd2 or more, towards the start zone z2, based on the measurement result M of the measurement unit 35b. If the user has moved backward by the set distance Sd2 or more, the process proceeds to step S14-2, where the first closed back mode is cleared, the counter Nf is cleared, the second closed back mode is set, and the process proceeds to the main flow.

If the user has not moved backward by the set distance Sd2 or more in step S14-1, 1 is added to the counter Nf in step S14-3, and then it is determined in step S14-4 whether or not the counter Nf has exceeded 20. If the counter Nf exceeds 20, the process proceeds to step S14-5, where the LED 30 is lighted out, the first closed back mode is cleared, the counter Nf is cleared, and the process proceeds to the main flow. If the counter Nf is 20 or less, on the other hand, the process proceeds directly to the main flow.

Second Closed Back Mode

Figure 12:
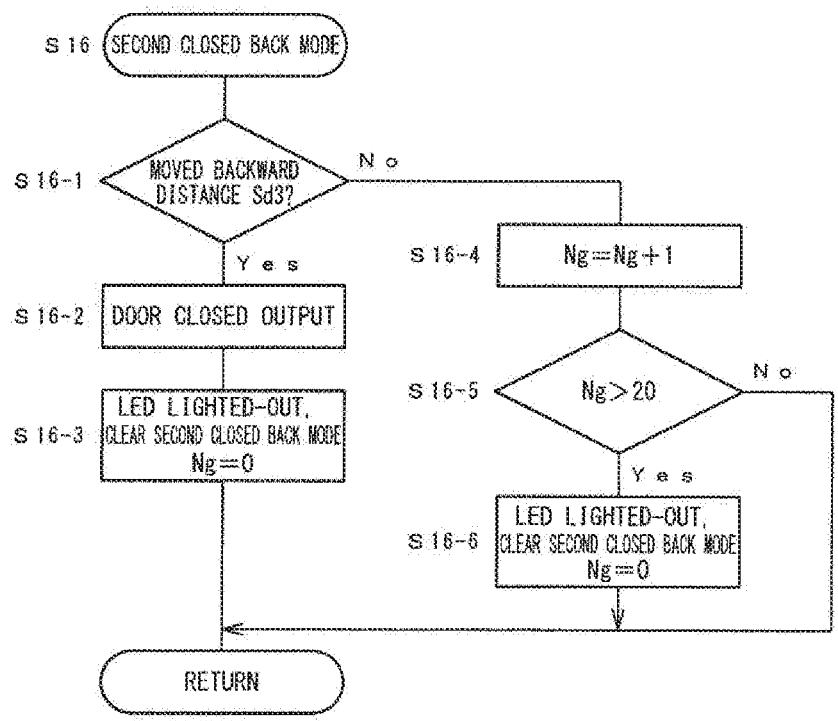
FIG. 12 is a flowchart showing a second closed back mode of FIG. 6B.

As shown in FIG. 12, in the second closed back mode of step S16, the controller 35 determines in step S16-1 whether or not the user has moved by the set distance Sd3 or more towards the start zone z2, based on the measurement result M of the measurement unit 35b. If the user has moved backward by the set distance Sd3 or more, the process proceeds to step S16-2, where a close signal of the door 4 is output, and the door drive unit 24 is driven to close the door 4. Next, in step S16-3, the LED 30 is lighted out, the second closed back mode is cleared, the counter Ng is cleared, and the process proceeds to the main flow.

If the user has not moved backward by the set distance Sd3 or more in step S16-1, 1 is added to the counter Ng in step S16-4, and then it is determined in step S16-5 whether or not the counter Ng has exceeded 20. If the counter Ng exceeds 20, the process proceeds to step S16-6, where the LED 30 is lighted out, the second closed back mode is cleared, the counter Ng is cleared, and the process proceeds to the main flow. If the counter Ng is 20 or less, the process proceeds directly to the main flow.

As described above, in the door opening and closing device 10 of the present embodiment, since the trigger zone z1 is set on the basis of the stopped position p1 of the user having entered the approach area "a", the position of the trigger zone z1 can be changed when the user changes the stopped position p1. Hence, for example, even if there is a puddle in the approach area "a", the trigger zone z1 can be set at a position avoiding the puddle, and the user can thus open and close the door 4 without stepping into the puddle. Even when there are walls or obstacles in the approach area "a", the user stands at a position avoiding the walls and the obstacles, and hence the position of the trigger zone z1 is changed, thereby allowing the door 4 to be opened and closed reliably. In this manner, since the opening and closing control of the door 4 can be executed in response to the surroundings of the door 4, the user convenience can be improved.

Since the distance to the trigger position p2 changes depending on the stopped position p1 of the user, it is possible to set the step amount for performing an opening and closing operation by the user's preference. Therefore, it is possible to prevent the opening and closing operation (movement) from being difficult due to a physical difference or the like. In addition, since the trigger zone z1 of a predetermined range including the trigger position p2 is set, the controller 35 can reliably determine the movement of the user. Since the trigger position p2 is displayed by the LED 30, it is possible to reliably guide the user to the trigger zone z1.

Also, before starting the control for driving the door drive unit 24, it is determined whether or not the subject having entered the approach area "a" is the user by the key authentication. Therefore, it is possible to eliminate a needless performing of control (determination) for driving the door drive unit 24 due to movement of a non-normal person or an animal.

Second Embodiment

Figure 13:
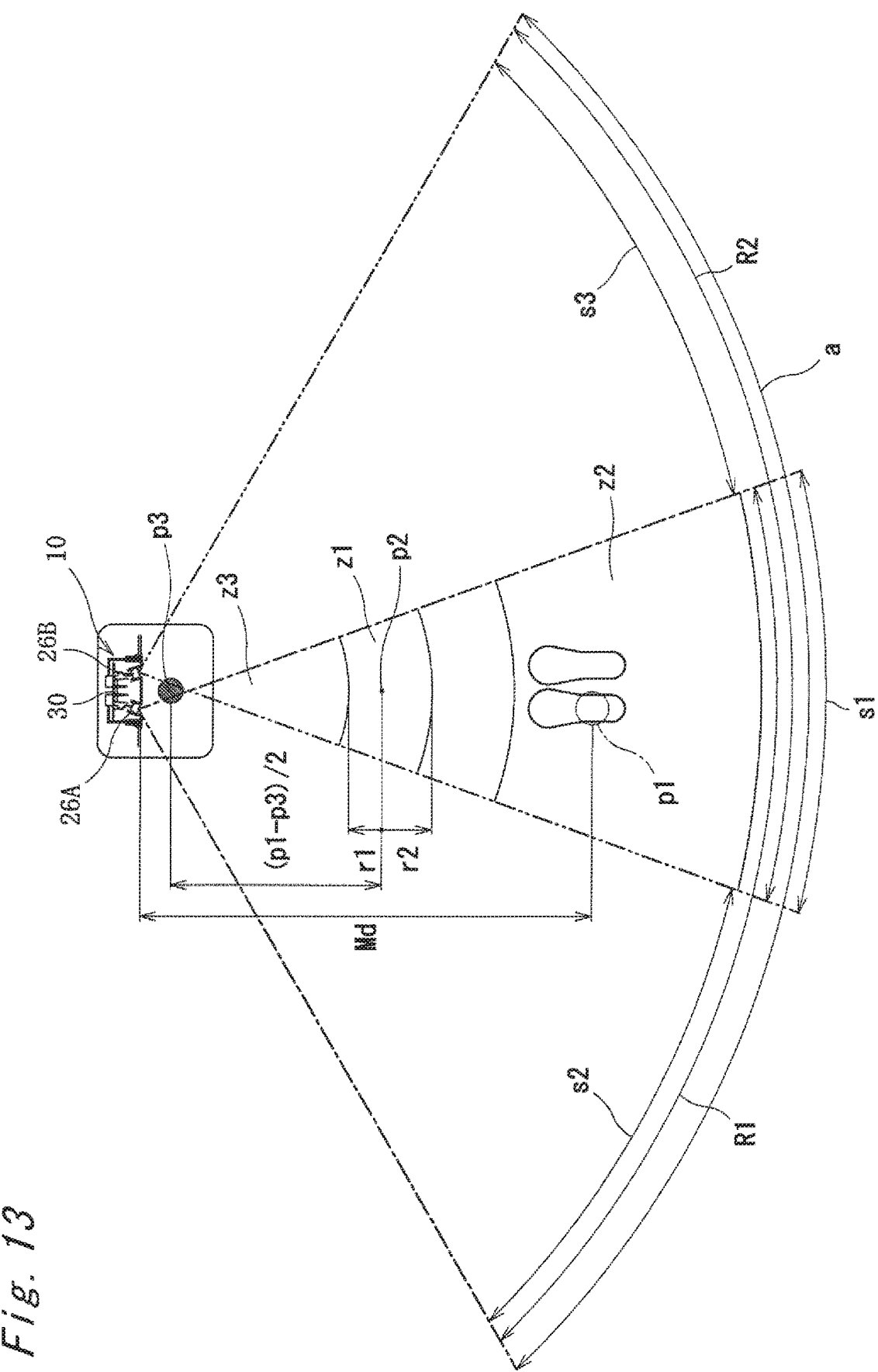
FIG. 13 is a plan view showing a relationship between a detection range and a display position of the door opening and closing device according to a second embodiment.

FIGS. 13 and 14 show the door opening and closing, device 10 of the second embodiment. This second embodiment is different from the first embodiment in that the display position p3 of the LED 30 is set under the vehicle body 2, and the trigger position p2 is set in an intermediate (p1–p3)/2 between the stopped position p1 and the display position p3. More specifically, the display position p3 of the LED 30 is on the ground G more forwardly than a rear end 3a of the rear bumper 3 of the vehicle body 2. In the second embodiment, since the display position p3 is not changed, the display drive unit 36 shown in FIG. 2 and FIG. 5 is not used. Further, the lens attachment portion 31 and the lens 32 are disposed on the cover 13 of the easing 12. The control by the controller 35 is different only in the absence of the step of changing the display position p3 in step S8-13 in the start mode of FIG. 8.

In the door opening and closing device 10 as described above, since the LED 30 displays under the vehicle body 2 (bumper) that becomes a shade, the display is not affected by the brightness of the surroundings. Therefore, it is possible to perform the display easily recognized by the user with the LED 30, and the user can thus be reliably guided to the trigger zone z1. Since the detection sensors 26A and 26B set the trigger position p2 to an intermediate position between the stopped position p1 and the display position p3, the user passing through the trigger zone z1 can be reliably detected when the user moves towards the display position p3.

The door opening and closing device 10 of the present invention is not limited to the configuration of the above embodiments, and various modifications can be made.

For example, the authentication by the matching means 22 may not be performed by the subject entering into the approach area "a". It may be performed by the vehicle 1 transmitting a radio wave for authentication as needed. As described above, the user's authentication timing by the matching means 22 can be changed as desired. Also, the display for guiding the user can be changed in terms of the size, shape, and luminance as desired. If the trigger zone z1 is close to the vehicle body 2, it may be made small, and if the trigger zone z1 is far away from the vehicle body 2, it may be made large.

The invention claimed is:
1. A door opening and closing device, comprising:
a door drive unit capable of opening and closing a door with respect to a vehicle body;
a detection means for detecting a subject present in an approach area set around the door, the detection unit being arranged in the vehicle body;
a measurement unit that measures a distance from the detection means to the subject based on a detection result of the detection means;
a determination unit that determines whether the subject has stopped in the approach area based on a measurement result of the measurement unit;
a setting unit that sets a location of a trigger zone within the approach area when the determination unit determines that the subject has stopped in the approach area, the location of the trigger zone being set based on a distance from the detection means to the stopped subject measured by the measurement unit at the time the determination unit determines that the subject has stopped in the approach area, the location of the trigger zone being set such that the shorter the distance, the nearer the trigger zone is set to be located with respect to the vehicle body; and
a control means for starting control to drive the door drive unit when the subject is determined to have moved into the trigger zone based on a measurement result of the measurement unit.

2. The door opening and closing device according to claim 1, wherein the setting unit sets a trigger position within the trigger zone based on the distance from the detection means to the stopped subject measured by the measurement unit at the time the determination unit determines that the subject has stopped in the approach area.

3. The door opening and closing device according to claim 2, wherein the trigger position is an intermediate position of the distance from the detection means to the stopped subject measured by the measurement unit at the time the determination unit determines that the subject has stopped in the approach area.

4. The door opening and closing device according to claim 1, comprising:
   a light-display means for performing optical display;
   a display drive unit capable of changing a display position displayed by the light-display means; and
   a display control unit that controls the display drive unit so as to change the display position in accordance with the trigger zone set by the setting unit.

5. The door opening and closing device according to claim 4, wherein the display control unit sets the display position in the trigger zone.

6. The door opening and closing device according to claim 1, comprising a light-display means for performing optical display in a set position under the vehicle body.

7. The door opening and closing device according to claim 2, further comprising a light-display means for performing optical display in a set position under the vehicle body,
wherein the trigger position is an intermediate position of a distance between a stopped position of the subject and a display position by the light-display means.

8. The door opening and closing device according to claim 1, wherein
the detection means includes:
a first detection means having a first detection range where the subject can be detected, and
a second detection means having a second detection range where the subject can be detected,
the approach area is set by the first detection range and the second detection range, in this approach area, an operation section where a part of the first detection range and a part of the second detection range are overlapped is set, and
the control means drives the door drive unit when determining that the subject has made a set movement in the operation section by a measurement result of the measurement unit based on a detection result of the first detection means and the second detection means.

9. The door opening and closing device according to claim 1, comprising a matching means for performing key authentication of an electronic key via wireless communication when the control means determines that a subject has entered the approach area based on a detection result of the detection means.

* * * * *